May 21, 1935. M. SHOELD 2,002,357
PROCESS FOR THE PURIFICATION AND SEPARATION OF GASEOUS MIXTURES
Filed Oct. 31, 1931
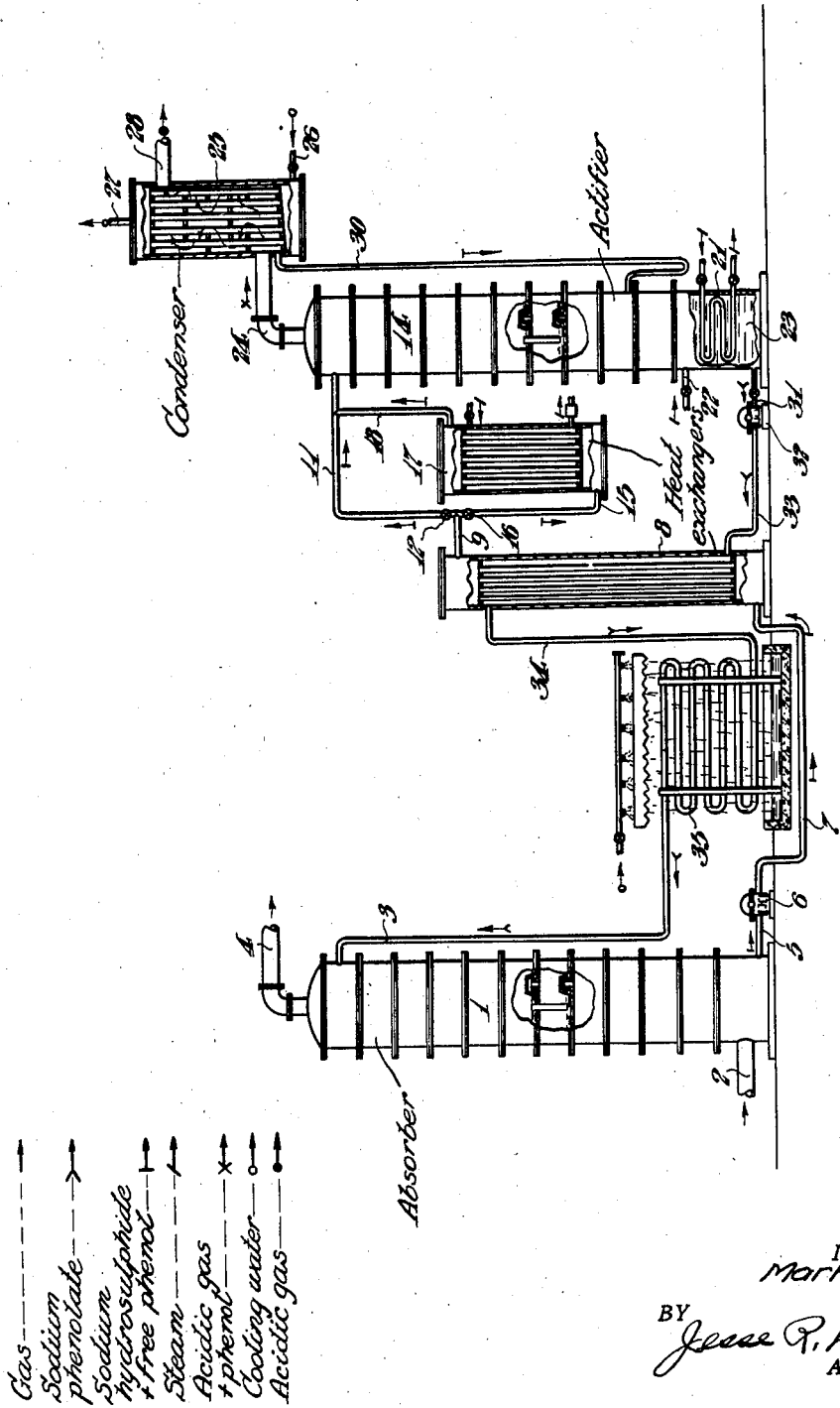
INVENTOR.
Mark Shoeld.
BY Jesse P. Langley
ATTORNEY.

Patented May 21, 1935

2,002,357

UNITED STATES PATENT OFFICE 2,002,357

PROCESS FOR THE PURIFICATION AND SEPARATION OF GASEOUS MIXTURES

Mark Shoeld, Mount Lebanon Township, Allegheny County, Pa., assignor to The Koppers Company of Delaware, a corporation of Delaware Application October 31, 1931, Serial No. 572,271

6 Claims. (Cl. 23—3)

This invention relates to the treatment of gaseous mixtures, such, for example, as coal gas, oil gas, water gas, natural gas, air and gases of combustion.

My invention has for an object the provision of an improved process of and apparatus for treating such gaseous mixtures to effect the separation therefrom of acidic gases, such as hydrogen sulphide, carbon dioxide, hydrogen cyanide and analogous substances.

A further object of my invention is to provide an improved process of and apparatus for purifying fuel gases and other gaseous mixtures in which such acidic gases occur as impurities.

A still further object of my invention is to provide an improved process of and apparatus for the actification of solutions employed in the separation or purification of gaseous mixtures as recited above.

My invention has for further objects such other operative advantages and results as may hereinafter be found to obtain.

In the copending application of Joseph A. Shaw Serial No. 570,961, filed Oct. 24, 1931, there is disclosed a gas purification process involving the recirculation of a solution containing an alkali-forming metal and an auxiliary acidic constituent through a cycle comprising an absorption stage in which the solution is brought into contact with the gaseous mixture for the removal of the acidic gas or gases therefrom, and an actification stage in which the solution is regenerated for further use by heating.

As examples of suitable auxiliary acidic constituents for the process hereinabove described, the aforesaid copending application of Shaw discloses certain volatile acidic substances, such as phenols and especially the so-called "tar acids", phenol, cresol and xylenol, which are liquids at ordinary temperatures under the conditions of the process. Solutions or liquid mixtures containing such phenols either as such or as phenolates as well as alkaline compounds (including phenolates) of alkali-forming metals such as sodium, potassium, ammonia, magnesium, and the like have been employed with particularly good results.

Ammonia, or more properly, the ammonium radicle (NH4) is included in the term "alkali-forming metals" as used herein, for the reason that it behaves as a metal and forms an alkali hydroxide and other compounds of alkaline reaction, and may therefore properly be considered as a metal for the purposes of my invention.

The term "phenol" as employed herein is employed to designate any one or a mixture of the several phenols, such as phenol itself, cresol and xylenol, and unless specifically limited to such material or materials in the free state may also refer to such materials in alkaline solution, i. e., as phenolates of an alkali-forming metal, in accordance with recognized chemical usage.

Although no particular theory is relied on as necessarily fully explaining the beneficial properties and results obtained by solutions of the character indicated, nevertheless the following discussion, using a liquid containing sodium and phenol as an example, may be informative:

When such a liquid, for example, a solution of sodium phenolate, is brought into contact with a gas, such as natural gas, containing hydrogen sulphide at ordinary absorption temperatures, that is to say, considerably below the boiling point of the solution, it absorbs H2S from the gas with consequent liberation of free phenol. All or a portion of the liberated phenol passes out of solution in the form of a mixture or solution of phenol and water immiscible with the main body of aqueous alkaline solution and hence is put out of phase with the aqueous solution of sodium sulphide or sodium hydrosulphide thus produced. This tendency to pass out of phase is probably at least partly responsible for the fact that the absorption of H2S by the solution is not materially hindered by the presence of the phenol.

If this sulphided solution or mixture of sulphided solution and phenol is then boiled, however, the presence of the phenol exerts a marked beneficial effect upon the actification of the liquid. The tendency of the acidic phenol to return to solution in the actifier exerting a strong effect upon the liberation of H2S.

It is therefore desirable to have free phenol present, preferably in excess, during substantially the entire actification stage. However, due to the more or less volatile nature of the phenol at actification temperatures this is difficult to accomplish. As a matter of fact unless proper provision is made to prevent it, all of the phenol present in free form will tend to be driven off in the vapors issuing from the actification stage. It has therefore been proposed to employ a reflux condenser or dephlegmator located in the path of the vapors leaving the actification stage, which condenser or dephlegmator is so operated as to condense any phenol leaving the actification stage, this condensate being returned to the top of the actifier in the usual manner.

I have found, however, that in many instances this method of procedure results in the maintenance of phenol in the upper portion only of the actifier, that is to say, that portion of the actifier nearest the point of admission of the solution or mixture of solution and phenol from the absorption stage.

I therefore provide a reflux condenser or dephlegmator in the path of the vapors issuing from the actification stage and a condensate return line which leads to the actifier at a point intermediate the solution inlet and the heating means or steam inlet and preferably closer to the heating means or steam inlet than to the solution inlet.

I have found that the return of the phenol condensate to the actifier in this manner makes it possible to maintain the desirable excess of phenol throughout substantially the entire actification zone, it being in some instances desirable, however, to limit the presence of free phenol in the actification zone to a point a little removed from the solution outlet so that the solution returning to the absorption stage does not contain free phenol in sufficient amount to cause serious loss of phenol in the gas being treated in the absorption stage.

In order that my invention may be clearly set forth and understood, I now describe with reference to the accompanying drawing a preferred manner in which it is practiced and embodied. In this drawing, The single figure is a more or less diagrammatic view, partly in elevation and partly in vertical section, of apparatus for purifying or separating gaseous mixtures constructed in accordance with my invention and suitable for the performance of my process.

Referring to this drawing, the gas to be purified, for example, natural gas containing hydrogen sulphide, is led into an absorber 1 through an inlet 2 located at the bottom thereof. In the drawing, the absorber 1 is shown as a conventional bell-and-tray type column, although it will be obvious to those skilled in the art that other types of gas-and-liquid contact apparatus may be substituted therefor.

The gas entering through the inlet 2 passes upward through the absorber 1 in countercurrent to a descending flow of absorbent liquid, such, for example, as a solution of sodium phenolate (which may or may not contain free phenol in an immiscible phase) introduced through a conduit 3 introduced at or near the top of the absorber 1 and is stripped of all or a considerable portion of its hydrogen sulphide content. The purified gas then passes out through an outlet 4 located at or near the top of the absorber 1.

The liquid reaching the bottom of the absorber 1 and ordinarily consisting of a mixture of a solution of sodium sulphide or sodium hydrosulphide and an immiscible phase comprising a mixture of water and free phenol passes out of the absorber 1 through a conduit 5 and it is delivered by a pump 6 through a conduit 7 to a heat exchanger 8.

The warm liquid passes out of the heat exchanger 8 through a conduit 9 and may all pass through a conduit 11 having a valve 12 into the top of an actifier 14 or all or a portion of the solution may be passed through a conduit 15 having a valve 16, a heater 17 and a conduit 18 for further heating, after which it passes into the top of the actifier 14 as before.

The actifier 14 may be similar in general construction to the absorber 1, but is provided with an indirect steam coil 21 and a direct steam pipe 22 located in a well 23 at the bottom of the actifier 14. Steam introduced through the conduit 22 or produced by the boiling of the solution when indirect steam is employed for heating passes upward through the descending solution which is thus brought to its boiling point, effecting the liberation of the acidic gases absorbed in the absorber 1.

This current of steam also causes the volatilization and entrainment of phenol and consequently the vapors issuing from the top of the actifier 14 contain phenol as well as steam and acidic gases. These vapors are conducted through a conduit 24 to a condenser or dephlegmator 25 which may be of the indirect type as shown or of any other suitable type.

In the present instance the indirect dephlegmator 25 is provided with a valved inlet 26 and an outlet 27 for the admission and removal, respectively, of cooling water. By indirect heat exchange with the cooling water in the condenser 25, the vapors entering the condenser through the conduit 24 are cooled to a temperature sufficient to cause the condensation of phenol as well as a considerable portion or all of the steam, but insufficient to cause the retention of any considerable amount of $H_2S$ or the like in the condensate. The cooled vapors then pass out of the condenser 25 through a conduit 28 for disposal as desired.

The condensate collected in the bottom of the vapor space in the condenser 25 returns through a sealed conduit 30 to the actifier 14 at a point relatively close to the steam inlet 22 and steam coil 21 but removed from the solution inlet, that is to say, the point where the conduit 11 enters the actifier 14.

The phenol removed from the vapors passing out of the actifier 14 thus passes down into the lower portion of the actifier 14 and is present during the actification stage to an extent which would not be possible if the condensate were merely returned from the condenser or dephlegmator 25 to the top of the actifier 14 because of the tendency of the steam passing upward through the actifier 14 to cause the removal of this phenol. In consequence of this the actification is made extremely effective and the efficiency of the process is materially increased.

The hot actified solution leaves the bottom of the actifier 14 through a conduit 31 and is delivered by a pump 32 through a conduit 33, the heat exchanger 8, a conduit 34, a cooler 35 and the conduit 3 to the top of the absorber 1, thus completing the cycle.

As has been pointed out hereinabove, my invention makes possible the full utilization of the phenol or other volatile auxiliary acidic substance in the actification stage in a simple and efficient manner, with consequent improvement in the process as a whole.

It will be readily understood by those skilled in the art that my invention is not limited to the specific details shown and described hereinabove by way of illustrative example but is to be construed as of the scope of the claims hereinafter made.

I claim as my invention:
1. The process of removing an acidic gas such as hydrogen sulphide, carbon dioxide or the like from a gaseous mixture containing the same, which comprises recirculating an absorbent liquid comprising a solution of an alkali-forming metal and a phenol in proportions to form an immiscible phase thereof in the absorbent liquid at the absorption temperature in the absorption stage through a cycle comprising an absorption stage located in the path of the gas and thereby removing acidic gas aforesaid therefrom and an actification stage in which it is caused to pass in counter-current to a flow of steam and thereby be freed from the absorbed acidic gas and be regenerated for further absorption as aforesaid, cooling vapors issuing from said actification stage to cause the condensation of phenol therefrom, and transferring the thereby condensed phenol to said actification stage at a point in said stage intermediate the points of introduction thereto of the absorbent liquid and steam, respectively, which is closer to the point of introduction of steam than to the point of introduction of the liquid and thereby maintaining an additional recirculating load of phenol into and out of the recirculating absorbent liquid in the actification stage.

2. In a process of removing an acidic gas such as hydrogen sulphide, carbon dioxide or the like from an alkaline absorbent solution therefor comprising passing the liquid through an actification stage in which the liquid is heated in the presence of a free acid selected from the group consisting of tar acids, phenol, cresol and xylenol, to expel the acidic gas from the solution, cooling vapors issuing from the actification stage to cause selective removal of the free acid from the acidic gas, and returning the condensed free acid to the actification stage, the improvement comprising introducing the condensed free acid being returned to the actification stage into the liquid in the latter stages of actification in the actification stage.

3. In a process of removing an acidic gas such as hydrogen sulphide, carbon dioxide or the like from an alkaline absorbent solution therefor comprising passing the liquid through an actification stage in which the liquid is heated in the presence of a free acid selected from the group consisting of tar acids, phenol, cresol and xylenol, to expel the acidic gas from the solution, cooling vapors issuing from the actification stage to cause the selective removal of the free acid from the acidic gas, and returning the condensed free acid to the actification stage, the improvement comprising introducing the condensed free acid being returned to the actification stage into the liquid in the latter stages of actification in the actification stage and causing the selected free acid so introduced to the actification stage to travel from the liquid in the latter stages through liquid in the earlier stages of actification, before the so returned free acid is drawn off with the vapors to be cooled from the actification stage.

4. A process of removing hydrogen sulphide, carbon dioxide and the like from a gaseous mixture containing the same which comprises: recirculating an absorbent liquid which comprises an aqueous alkaline solution for absorption of $H_2S$ and $CO_2$, and an acidic volatile constituent soluble in the liquid for augmenting the subsequent removal from the liquid of the absorbed $H_2S$ and $CO_2$ upon heating, through a cycle comprising an absorption stage located in the path of the gas to remove $H_2S$ and $CO_2$ therefrom and through an actification stage in which the liquid is caused to pass in countercurrent to a flow of steam to free the absorbent liquid from the $H_2S$ and $CO_2$ absorbed from the gas and regenerate the liquid for further absorption, cooling the vapors issuing from said actification stage to cause the selective condensation of the said acidic volatile constituent from the $H_2S$ and $CO_2$ being removed from the absorbent liquid in the actification stage, and returning the condensate thereby obtained to said actification stage at a point in said stage intermediate the points of introduction thereto of the absorbent liquid and steam, respectively, which is closer to the point of introduction of steam than to the point of introduction of the absorbent liquid and thereby maintaining an additional recirculating load of said augmenting acidic constituent into and out of the absorbent liquid in the actification stage with the recirculating load entering where the absorbent liquid has already undergone a substantial part of its treatment in said stage.

5. In the process of removing acidic gases such as hydrogen sulphide, carbon dioxide, and the like from a gas mixture containing the same by recirculating an absorbent liquid comprising a solution of alkali-forming metal compound for acidic gas aforesaid through a cycle comprising an absorption stage to remove acidic gas aforesaid from the gas mixture and an actification stage to free said liquid from the absorbed acidic gas and regenerate it for further absorption as aforesaid, the improvement which comprises maintaining in the actification stage a recirculatory load of tar acid in quantity effective to promote actification of the solution, the recirculating load being introduced at an intermediate stage of the actification where the liquid has already undergone considerable actification but still must thereafter undergo further actification before passing out of the actification stage to the absorption stage and the recirculatory load being withdrawn from the actification stage where the absorbent liquid enters the actification stage.

6. In the process of removing acidic gases such as hydrogen sulphide, carbon dioxide, and the like from a gas mixture containing the same by recirculating an absorbent liquid comprising a solution of alkali-forming metal compound for acidic gas aforesaid through a cycle comprising an absorption stage to remove acidic gas aforesaid from the gas mixture and an actification stage to free said liquid from the absorbed acidic gas and regenerate it for further absorption as aforesaid, the improvement which comprises maintaining in the actification stage a recirculatory load of a phenol, to promote substantially actification of the absorbent liquid, into and out of the recirculating absorbent liquid in the actification stage, the recirculatory load entering the recirculating absorbent liquid in the portion thereof in the latter stages of the actification and being withdrawn from the recirculating absorbent liquid at the initital stage of the actification of the recirculating absorbent liquid.

MARK SHOELD.